United States Patent [19]

Weiler

[11] 4,269,110
[45] May 26, 1981

[54] REACTION LEVER MECHANISM FOR A VACUUM BRAKE BOOSTER

[75] Inventor: Rolf Weiler, Frankfurt-Sindlingen, Fed. Rep. of Germany

[73] Assignee: ITT Industries, Inc., New York, N.Y.

[21] Appl. No.: 28,469

[22] Filed: Apr. 9, 1979

[30] Foreign Application Priority Data

May 31, 1978 [DE] Fed. Rep. of Germany ....... 2823784

[51] Int. Cl.³ .................... F15B 9/10; F01B 19/00; F16J 3/02
[52] U.S. Cl. ................................ 91/369 B; 92/98 R
[58] Field of Search .............. 91/369 B, 369 A, 369 R

[56] References Cited

U.S. PATENT DOCUMENTS

| 2,900,963 | 8/1959 | Ayers, Jr. | 91/369 B |
| 3,102,453 | 9/1963 | Brooks et al. | 91/369 B |
| 3,661,054 | 5/1972 | Brown | 91/369 B |
| 3,712,177 | 1/1973 | Bach et al. | 91/369 A |
| 4,007,664 | 2/1977 | Popp | 91/369 B |

Primary Examiner—Paul E. Maslousky
Attorney, Agent, or Firm—John T. O'Halloran; Alfred C. Hill

[57] ABSTRACT

The reaction mechanism comprises a control casing secured to a movable member separating a vacuum chamber from a working chamber in a vacuum brake booster; reaction levers engaging to the casing adjacent the vacuum chamber; a reaction plate guided and secured against lateral displacement in recesses in the casing adjacent the vacuum chamber and engaging the side of the levers adjacent the vacuum chamber; a cap secured to the outer edge of the casing adjacent the vacuum chamber having a guide sleeve therein extending into the vacuum chamber, the cap enclosing the plate and the levers; and a master cylinder actuating push rod guided in the guide sleeve and having one end thereof abutting against the plate.

11 Claims, 5 Drawing Figures

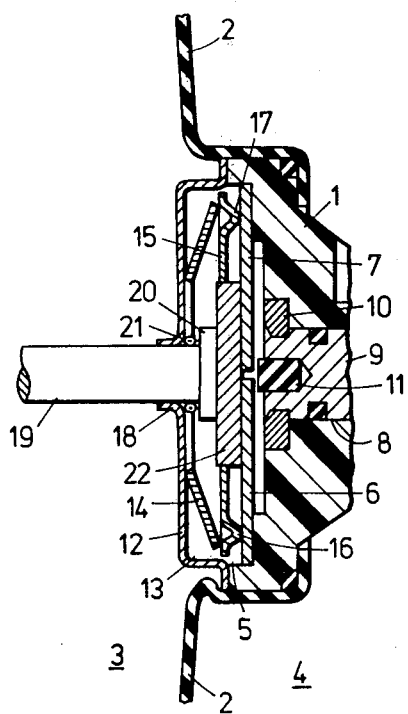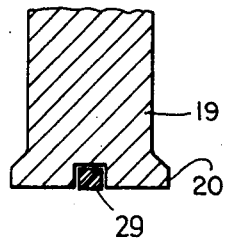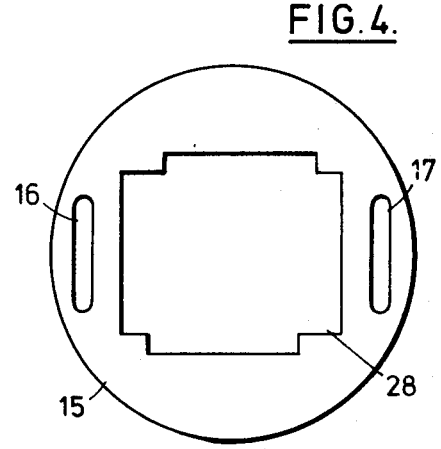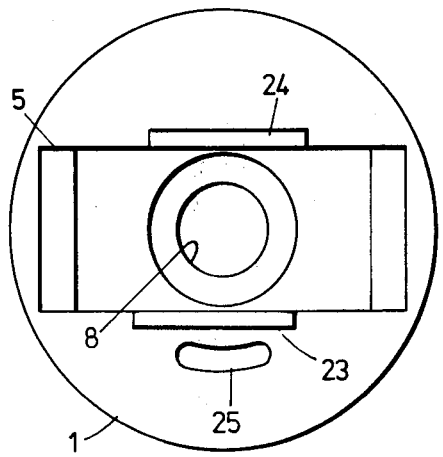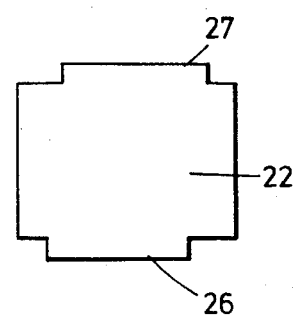

REACTION LEVER MECHANISM FOR A VACUUM BRAKE BOOSTER

BACKGROUND OF THE INVENTION

The present invention relates to a vacuum brake booster and more particularly to a reaction lever mechanism therefore.

From U.S. Pat. No. 3,102,453, a vacuum brake booster is known which comprises a compartment in which a constant vacuum prevails, a compartment in which different pressures prevail, a movable wall dividing the compartments and being mounted on a plunger or push rod acting on a master cylinder piston, and a control valve carried by the movable wall which is actuatable by a brake pedal. The control valve controls the differentials of pressure acting on the movable wall. The end of the plunger close to the control valve is provided with a reduced-diameter end onto which a reaction disc or plate is pressed. Between the reaction disc and the control valve, three reaction levers are positioned which on one side bear against the movable wall radially outwardly and against a reaction-delaying spring radially inwardly, and on the other side bear against the disc. In this arrangement, the reaction-delaying spring is positioned in an opening, close to the vacuum compartment, in the valve piston of the control valve. The biasing force of the spring provides for what is termed a "two-stage reaction" which means that there is a retardation of the reaction force acting on the brake pedal.

The magnitude of the two-stage reaction is dependent upon the strength of the reaction-delaying spring and the distances between the points of contact of the reaction levers. Since the space available for accommodating the spring is limited, its effect can only be changed by changing the leverage. A displacement of the points of contact where the reaction levers are in engagement with the spring and the movable wall entails substantial difficulties because of the resulting major constructional changes.

The reaction disc or plate positioned at the end of the push rod and engaging the reaction levers is subjected to high bending stresses. In plates including a bore, the permissible bending moment is substantially lower than in arrangements where the reaction plate is butt welded to an end of the push rod. The permissible bending moment is particularly low in reaction plates having a central bore for fastening to the push rod and of rectangular construction because only two reaction levers are provided. The permissible bending moment may be increased by providing thicker reaction plates which are, however, heavier and more expensive.

As mentioned previously, arrangements are known in which the reaction plate is butt welded to an end of the push rod. In such arrangements, the geometrical moment of inertia of the reaction plate is high because a bore is not necessary. When welding the parts together, extreme care must be taken to achieve precise centering.

To achieve proper functioning of the reaction lever mechanism and a precise two-stage reaction operation in the prior known brake boosters, it is necessary to provide for an accurate support for the push rod at the end adjacent the control valve in order for the reaction plate edge to act upon the reaction levers at the desired point.

In the known brake boosters, different two-stage reactions may be produced by mounting push rods with reaction plates of different size. Since, however, the brake boosters are equipped with different push rods and different types of reaction plates, there results a considerable number of combination possibilities. For each booster type, a complete pre-fabricated push-rod-and-reaction-plate unit must be made available.

SUMMARY OF THE INVENTION

It is, therefore, an object of the present invention to provide a vacuum brake booster including a reaction lever mechanism of the type referred to hereinabove, wherein the reaction plate has a high geometrical moment of inertia in spite of its low thickness, does not necessitate a precise centering between the push rod and reaction plate and, in addition, eliminates the need for an accurate push rod support.

A feature of the present invention is the provision of a reaction lever mechanism for a vacuum brake booster comprising: a control casing secured to a movable member separating a vacuum chamber and a working chamber of the brake booster; at least two reaction levers engaging a rectangular indentation in the casing adjacent the vacuum chamber; a reaction plate guided and secured against lateral displacement in a recess provided in each longitudinal side of the indentation, the plate engaging the side of the levers adjacent the vacuum chamber; a cap secured to the outer edge of the casing adjacent the vacuum chamber having a guide sleeve therein extending into the vacuum chamber, the cap enclosing the plate and the levers; and a master cylinder actuating push rod guided in the guide sleeve and having one end thereof abutting against the plate.

The arrangement of the present invention results in a number of advantages which are:

(1) the necessity of connecting the push rod with the reaction plate and the centering required for this purpose is eliminated since the reaction plate is guided and held in the control casing;

(2) the edge of the plate acts always upon a defined point on the reaction levers without requiring an accurate push rod support, because the reaction plate is secured against lateral displacement in the control casing;

(3) the geometrical moment of inertia of the reaction plate is increased and the strength of the reaction plate is reduced;

(4) only the reaction plate needs to be exchanged if it is desired to change the booster and the two-stage reaction operation transmission ratio; and (5) warehousing of the individual components for different types of boosters is simplified while at the same time all combination possibilities are available.

In accordance with a preferred embodiment of the subject matter of the present invention, the end of the push rod adjacent the reaction plate is of a diameter greater than the push rod. The surface pressure is thereby reduced. To avoid noise, a cushioning member made of a thermoplastic material of high toughness is provided in the face of the push rod end adjacent the reaction plate. The cushioning member is preferably made of polyurethane or polyamide.

In a particularly advantageous embodiment of the subject matter of the present invention, the reaction plate includes asymmetric step-like projections which are conformed to asymmetric recesses in the control casing. By means of this arrangement, the reaction plate can only be inserted with a specific side adjacent the reaction levers. The burr produced during forming of the reaction plate need not be removed since the side including the burr is always adjacent the push rod. This eliminates the need for deburring the reaction plate.

Another advantage is achieved by arranging the projections in the area where the bending stress is the highest, the projections thus serving to increase the geometrical moment of inertia of the reaction plate. Suitably positioned on the push rod between the end of the push rod adjacent the reaction plate and the cap is an elastic ring which serves to retain the push rod in engagement with the reaction plate and prevent the reaction plate from slipping out of its guide prior to the assembly of the vacuum brake booster with a master cylinder. In addition, this ring has a noise-reducing effect.

BRIEF DESCRIPTION OF THE DRAWING

Above-mentioned and other features and objects of this invention will become more apparent by reference to the following description taken in conjunction with the accompanying drawing, in which:

FIG. 1 is a longitudinal cross section of an embodiment of a reaction lever mechanism of a vacuum brake booster in accordance with the principles of the present invention;

FIG. 2 is a view of the control casing of FIG. 1 viewed from the vacuum chamber;

FIG. 3 is a top plan view of a reaction plate employed in the embodiment of FIG. 1;

FIG. 4 is a top plan view of a spring plate employed in the embodiment of FIG. 1; and FIG. 5 is a longitudinal cross section through the end of a push rod employed in the embodiment of FIG. 1.

DESCRIPTION OF THE PREFERRED EMBODIMENT

FIG. 1 shows a detail of a control casing 1 which is secured in a diaphragm member 2 providing a partition between a vacuum chamber 3 and a working chamber 4. Two reaction levers 6 and 7 are arranged in a flat indentation 5 of control casing 1. Guided in a coaxial bore 8 in control casing 1 is a valve piston 9 which is provided with a stop ring 10 limiting the axial movement of valve piston 9. A valve piston cushioning member 11 is arranged in the middle of the front end of valve piston 9 adjacent reaction levers 6 and 7.

Secured to the side of diaphragm member 2 adjacent vacuum chamber 3 is a cap 12 which bears against the outer edge of control casing 1. Received in a chamber 13 of cap 12 is a Belleville spring 14 bearing on the one side against the front wall of chamber 13 and on the other side against a spring plate 15 which is in interaction with reaction levers 6 and 7. In the area of reaction levers 6 and 7, spring plate 15 is provided with narrow projections 16 and 17, for instance, a bead, on the side adjacent reaction levers 6 and 7.

Cap 12 is provided with a guide sleeve 18 extending approximately coaxially with valve piston 9 and guiding a push rod 19 therein which acts on the piston of a master cylinder not shown in the drawing. The end 20 of push rod 19 adjacent reaction levers 6 and 7 is of increased diameter, and a ring 21 made of an elastic material is positioned between end 20 of push rod 19 and cap 12. Disposed between push rod 19 and reaction levers 6 and 7 is a reaction plate 22 which is in interaction with end 20 of push rod 19 and reaction levers 6 and 7.

FIG. 2 shows control casing 1 as a component such as it is viewed, prior to assembly, from the side lying adjacent vacuum chamber 3 when in the assembled state. The coaxial bore 8 is in the center of round control casing 1. A longitudinal flat indentation 5 extends nearly over the entire outside diameter of control casing 1. On the two longitudinal sides of flat indentation 5, recesses 23 and 24 are provided in control casing 1 which are of the same length, yet offset, so that an asymmetric arrangement results, that is, recesses 23 and 24 are asymmetric with respect to each other and the longitudinal axis of push rod 19 and piston 9. Outside indentation 5 a vent 25 is provided permitting the passage of air.

FIG. 3 is a top plan view of reaction plate 22 whose width corresponds approximately to the width of indentation 5 of FIG. 2. On its longitudinal sides, reaction plate 22 has step-shaped projections 26 and 27 which are an asymmetric arrangement with respect to each other and conformed to recesses 23 and 24 of FIG. 2.

FIG. 4 shows spring plate 15 with an opening 28 which is shaped like reaction plate 22 and receives reaction plate 22 in the assembled state. Projections 16 and 17 are provided adjacent the edge of spring plate 15 on both broadsides of opening 28.

FIG. 5 is a section, on an enlarged scale, of the end of push rod 19 adjacent reaction plate 22. End 20 of push rod 19 has a greater diameter than the remainder of push rod 19, its face being recessed to receive a cushioning member 29. Cushioning member 29 is required to be a thermoplastic material of high toughness, for example, polyurethane, polyamide, etc.

Since control casing 1 is conventionally an injection-molded part, it is not necessary to provide an additional operation step for providing recesses 23 and 24. The elimination of the push rod 19/reaction plate 22 connection results in a less complicated guiding of push rod 19 and simplified manufacture.

While I have described above the principles of my invention in connection with specific apparatus it is to be clearly understood that this description is made only by way of example and not as a limitation to the scope of my invention as set forth in the objects thereof and in the accompanying claims.

I claim:

1. A reaction lever mechanism for a vacuum brake booster comprising:
   a control casing secured to a movable member separating a vacuum chamber and a working chamber of said brake booster;
   at least two reaction levers engaging a rectangular indentation in said casing adjacent said vacuum chamber;
   a reaction plate guided and secured against lateral displacement in a recess provided on each longitudinal side of said indentation, said recesses being asymmetric with respect to each other and a longitudinal axis of said casing, said plate engaging a side of said levers adjacent said vacuum chamber and including a step-like projection on each longitudinal edge thereof, each of said projections engaging a different one of said asymmetric recesses;
   a cap secured to the outer edge of said casing adjacent said vacuum chamber having a guide sleeve therein extending into said vacuum chamber, said cap enclosing said plate and said levers; and a master cylinder actuating push rod guided in said guide sleeve and having one end thereof abutting against said plate.

2. A mechanism according to claim 1, wherein said one end of said push rod has a larger diameter than the diameter of the remainder of said push rod.

3. A mechanism according to claim 2, wherein the face of said one end of said push rod adjacent said plate includes
a recess to receive a cushioning member.

4. A mechanism according to claim 3, wherein said cushioning member is made of a thermoplastic material having high toughness.

5. A mechanism according to claim 4, wherein said material is polyurethane.

6. A mechanism according to claim 4, wherein said material is polyamide.

7. A mechanism according to claim 2, further including
an elastic ring positioned on said push rod between said one end of said puch rod and the inner surface of said cap.

8. A mechanism according to claim 1, wherein the face of said one end of said push rod adjacent said plate includes
a recess to receive a cushioning member.

9. A mechanism according to claim 8, wherein said cushioning member is made of a thermoplastic material having high toughness.

10. A mechanism according to claim 9, wherein said material is polyurethane.

11. A mechanism according to claim 11, wherein said material is polyamide.

* * * * *